May 1, 1928.  
F. M. KINCAID  
1,668,210  
MOTOR VEHICLE TRANSMISSION MECHANISM  
Filed May 25, 1926 3 Sheets-Sheet 3
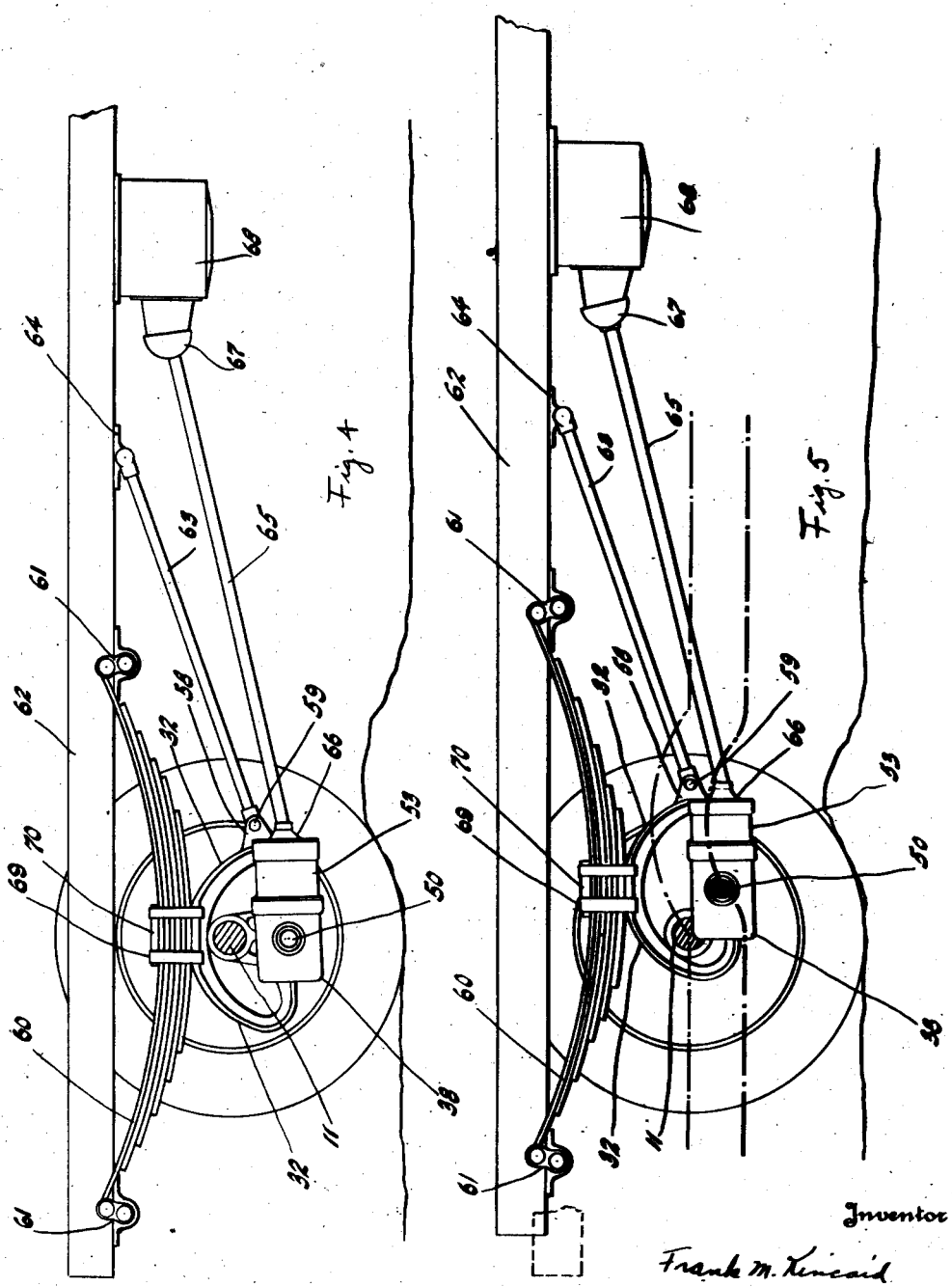

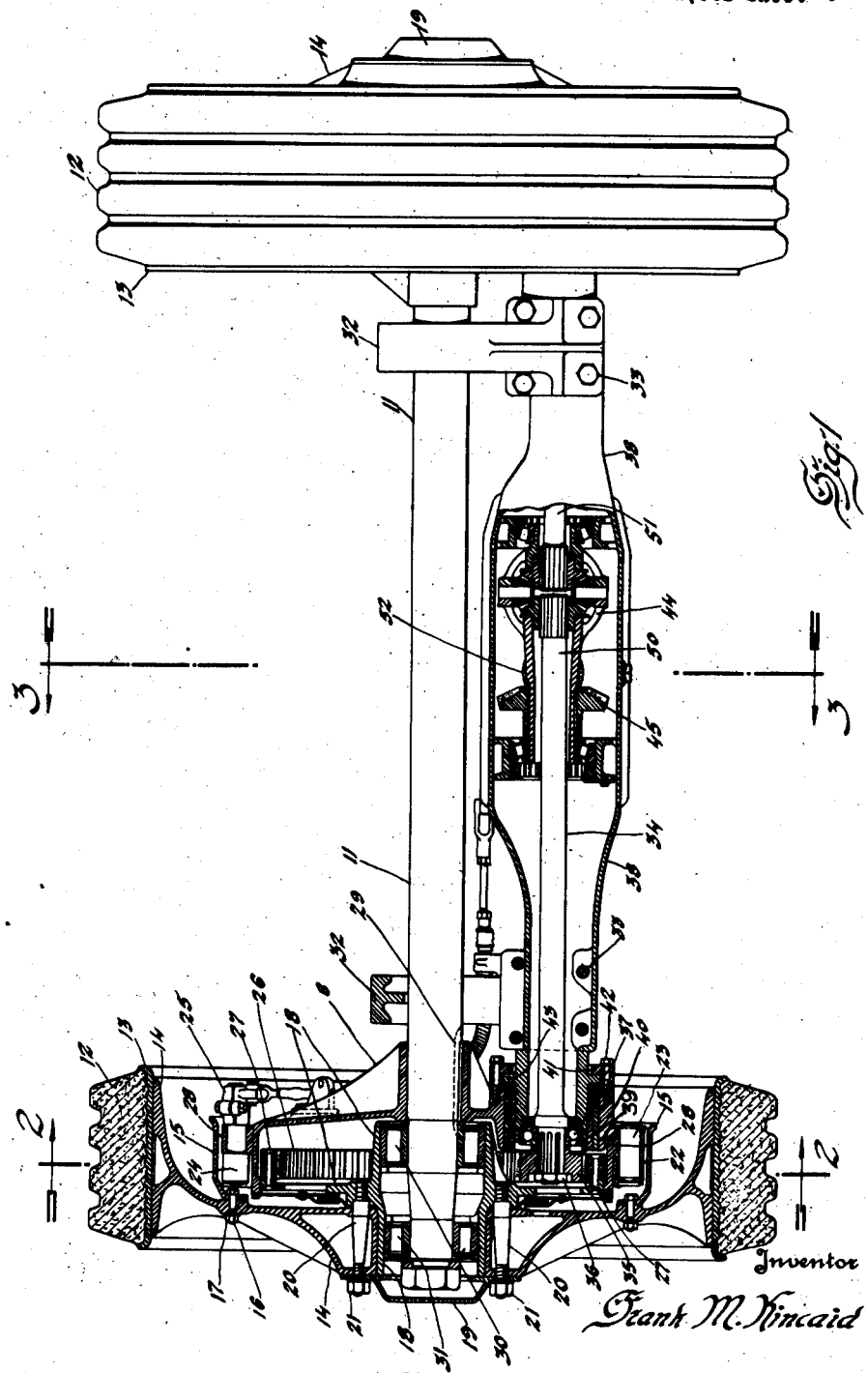

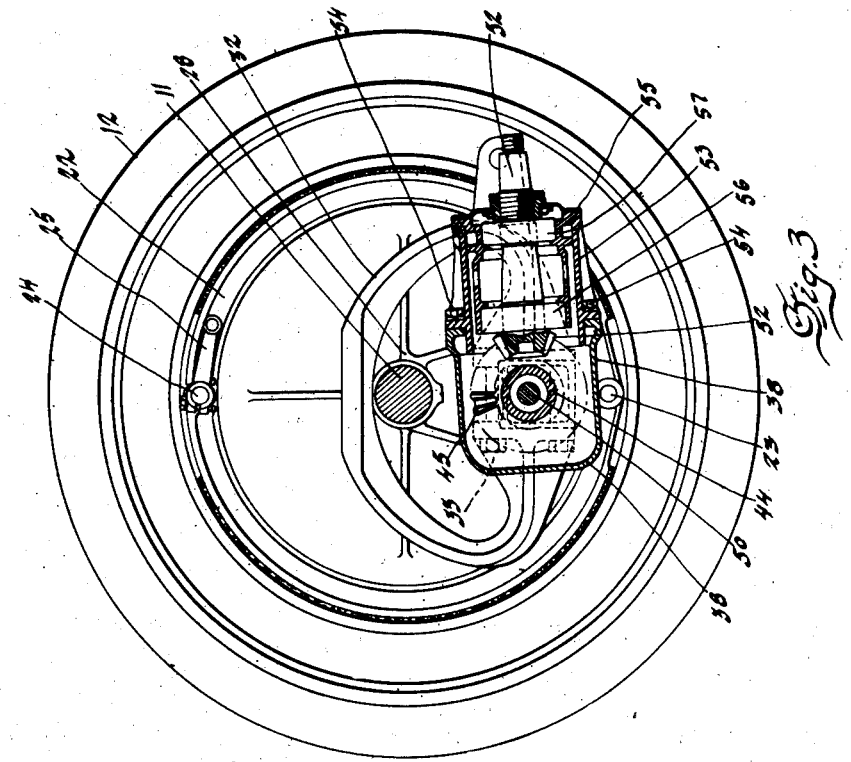
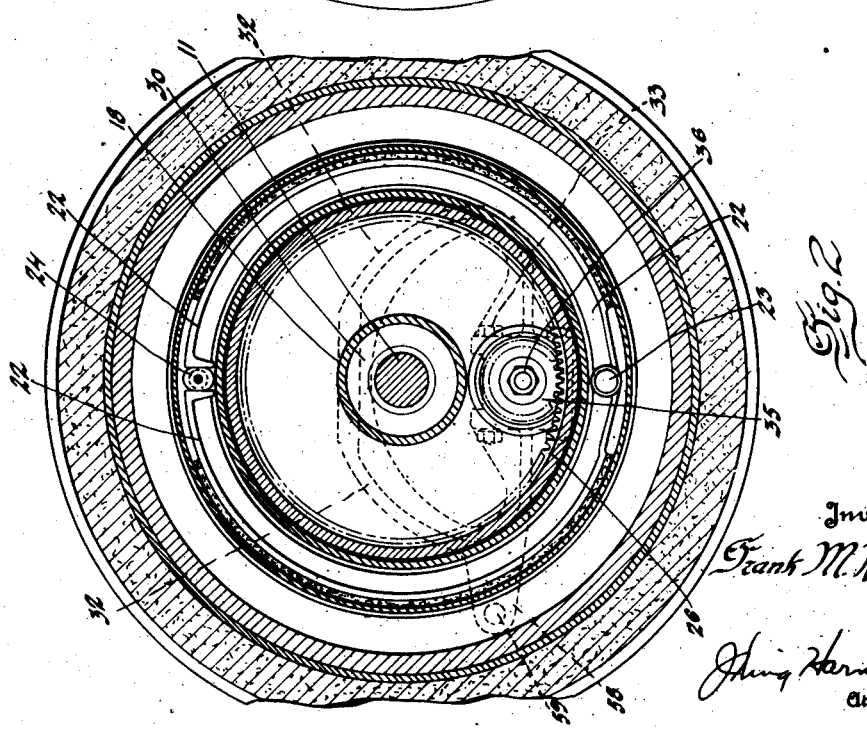

Patented May 1, 1928.

1,668,210

UNITED STATES PATENT OFFICE.

FRANK M. KINCAID, OF YPSILANTI, MICHIGAN, ASSIGNOR, BY MESNE ASSIGNMENTS, TO RELAY MOTOR PRODUCTS CORPORATION, OF BRIDGEPORT, CONNECTICUT, A CORPORATION OF DELAWARE.

MOTOR-VEHICLE TRANSMISSION MECHANISM.

Application filed May 25, 1926. Serial No. 111,476.

My invention relates to improvements in driving mechanism for motor vehicles wherein the weight of the vehicle together with its load may be utilized to assist the forward and rearward rotation of the driving wheels in addition to the torque delivered to the driving wheels from the source of motive power.

This invention more specifically deals with the mounting of the load carrying springs on a drive shaft housing, which in turn is swingably supported from a centre axle, and permitting the use of leaf springs of conventional design that are more nearly flat under load, placing them above the centre axle in such a manner that they will not interfere with the movements of the centre axle when it is performing its functions, there being considerable relative motion of the centre axle with respect to the driving axle and the springs.

In this invention I have made a simple and strong construction and yet allow for all functional motions and clearances, and have in many ways improved details of design and construction.

With the above and other objects in view, my invention consists of the arrangement, combination and construction of the various elements of my improved device as described in the specifications, claimed in my claims and shown in the accompanying drawings, in which:

Fig. 1 is a rear elevation, partly in section, of the entire axle construction including wheels and tires.

Fig. 2 is a section taken on line 2—2 of Fig. 1.

Fig. 3 is a section taken on line 3—3 of Fig. 1.

Fig. 4 is a side elevation of the rear portion of the vehicle chassis with the near wheel removed to disclose the relative location of the axle elements in their normal position.

Fig. 5 is a side elevation of the rear portion of the vehicle chassis with the near wheel removed to disclose the relative location of the axle elements when an obstacle is encountered and the wheel momentarily stops.

In the drawings, 11 is the dead or load carrying axle, constructed in one solid piece throughout its length. On the ends of the dead axle 11 are mounted the anti-friction bearings 30 and 31 and on these bearings the hub 18 rotates. The wheel body 14 is mounted on the hub 18 and is held securely thereto by the stud bolts 20 and the nuts 21. On the wheel body 14 is mounted the rim 13 which in turn carries the tire 12. The brake drum 15 is secured to the wheel body 14 by the bolts 16 and the nuts 17. On the flange of the hub 18 is mounted the internal gear ring 26 by means of a series of rivets 27. This permits the gear ring 26 to be made of forged steel or any metal different from the wheel body 14, besides making replacement of the gear ring possible without replacing the entire hub structure.

The large spider casting 28 is rigidly attached to the dead axle 11 by means of the keys 29. To the spider 28 are attached the brake shoes 22 by the anchor pin 23 and the brake operating cam 24. Cam 24 and its shaft are integral and to it is attached the brake operating lever 25. In the lower portion of the spider 28 is an opening having a rotatable eccentric liner 39 therein with a bushing 40 within the liner. Within the bushing 40 the drive shaft housing 38 is free to rotate, but is restrained laterally by the collar 41 which is held firmly against the flange 43 by the bolts 42, which extend into the spider 28 through the end flange of the liner 39 and thus serve the double purpose of locking the liner 39 against rotation and securing the collar 41 against axial movement. The drive shaft housing 38 extends across the axle from wheel to wheel and the end constructions are the same in either wheel. In the outer ends of the housing 38 are the anti-friction bearings 37 which support the drive shafts 50 and 51. On the ends of these drive shafts 50 and 51 are fastened the driving pinions 35. The fastening in this construction is effected by splines and nut 36. The pinion 35 accurately meshes with the ring gear 26 on each wheel, the eccentric liner 39 being turned to vary the distance between the axis of the shaft 50 and the dead axle 11 till a proper tooth contact is made between the teeth and then locked against rotation by the bolts 42, and since the ring gear 26 is attached to the hub 18, it follows that rotation of the shaft 50 will cause the wheel to rotate at a relative speed as determined by the ratio of the number of teeth in the pinion 35 and the ring gear 26.

It follows that if the wheel meets with rotative resistance, and motive power is applied to the shaft 50, the pinion 35 will start to climb up around the inside of the ring gear 26 and carry with it the entire drive shaft housing construction. This is possible because the spider 28 can rotate on its axis and carry the dead axle 11 with it, the dead axle rotating within the hub on the wheel bearings. During this climbing effect, the drive shaft housing 38 will rotate on its center with respect to the spider 28, because of its freedom of rotation within the bushing 40 which is provided for this purpose. Since there is a duplicate spider 28 on each side of the axle unit, and since each spider is keyed to the dead axle 11, it follows that any tendency to climb on one side will be duplicated and synchronized on the other side. It will be noted that if this climbing motion has taken place, a downward load imposed on the drive shaft housing will, by reason of the force of gravity, exert a turning force on the inside of the ring gear 26, tending to urge the wheel forward, and this force will be in addition to the rotative force of the pinion 35 tending to transfer its rotative torque to the ring gear 26. As soon as the housing again swings down to its lowermost position, the driving action is then alone effected by the transfer of power from the pinion 35 to the ring gear 26. In normal action, the moment a slight additional resistance to the rolling of the wheels occurs, they slow up and the climbing effect takes place to assist the forward motion of the vehicle, very much like the well known treadmill or squirrel cage.

To impose the vehicle load on the drive shaft housing, the arched perches 32 are rigidly attached to the housing 38 by means of the bolts 33. These arched perches 33 are shaped as shown in Figs. 2 and 3, so that they clear the dead axle 11 in its extreme positions as indicated in Figs. 4 and 5.

Motive power is transmitted to the shafts 50 and 51 from the gear case 68 through the universal joint 67, propeller shaft 65, and universal joint 66 to the bevel pinion 52, which in turn transfers its torque to the bevel gear 45. Bevel gear 45 is rigidly attached to a conventional differential 44, in which are splined the shafts 50 and 51.

Integral with the arched perches 32 are the bosses 58, to which are attached the radius rods 63 by the pins 59, and the radius rods are hinged to the chassis frame 62 at the brackets 64. The leaf springs 60 are attached rigidly to the arched perches 32 by means of the clips 69 and plates 70. The springs are connected to the frame 62 at each end of each spring by means of the shackles 61.

It will be noted that the radius rods 63 maintain the shaft and gear 52 in an approximately horizontal position at all times, thus maintaining practically a constant universal joint angle. All driving forces tending to move the vehicle forward or backward are transmitted to the chassis frame through the radius rods 63, because the springs are shackled at both ends and thus free to move longitudinally to correct any slight longitudinal motion of the arched perch 32 caused by the arcuate path of the rods 63 where they attach to the perch 32 at the pin 59.

An examination of the Figs. 4 and 5 will disclose the relative positions of the elements when in a position of rest as shown in Fig. 4 and after the climbing action has occurred as shown in Fig. 5. It will be seen that when an obstacle is encountered and the wheel momentarily stands still, the climbing action previously described, takes place and the vehicle chassis is actually moved forward, whereupon the weight of the vehicle combines with the torque of the driving gears to roll the wheel over the obstruction and to its original relative position as shown in Fig. 4.

The clearance space in the arched perches 32 is sufficient to take care of all normal needs, but when extreme conditions are encountered, the dead axle comes in contact with the inner loop of the arched perch 32 and thereby limits further and undesirable motion. Any tendency of the housing 38 to rotate about its center in resisting gear torque is transferred to the leaf springs 60 which in turn will cushion and resist this torque through the shackles 61 to the frame 62.

It should be noted that because the housing 38 is mounted below the axle 11, the climbing tendency will be in the right direction to assist in driving the vehicle either forward or backward with equal facility.

Since the brake shoes 22 are anchored to the spider 28, it follows that when the brakes are actuated, the contact between the shoes 22 and the drum 15 tends to rotate the spider 28 in the same direction as the rotation of the wheels, thus causing the drive shaft housing to virtually climb up around the dead axle in the correct direction to permit the weight of the vehicle to add to the retarding force, and in turn transmit the brake reacting torque to the leaf springs.

It will be apparent now that I have devised a novel and useful construction in a very simple combination. Obviously, changes in detail may be made by one skilled in the art without departing from the theory of my invention, and I do not care to limit myself to any particular form or arrangements of these elements.

What I claim is:

1. A shaft housing, load carrying springs supported from said housing, a dead axle swingable in relation to said housing beneath said springs, wheels mounted on said axle and a power transmission shaft in said housing and operatively connected to said wheels.

2. A shaft housing, arch shaped spring perches on said housing, load supporting springs on said perches, an axle paralleling said housing, and swingably supported in relation thereto within said perches, wheels on said axle and a power transmitting shaft within said housing and operatively connected to said wheels.

3. In combination, a vehicle frame, a shaft housing, arch shaped spring perches mounted on said housing, load supporting springs mounted on said perches and secured to said frame, an axle paralleling said housing and swingably supported in relation thereto within the arch of said perches, radius rods connected at one end to said frame and at the other end to said perches, wheels on said axle, and a power transmitting shaft within said housing and operatively connected to said wheels.

4. In combination, a dead axle, a wheel rotatably mounted on the end thereof, a member fixed on and depending from said axle, an aperture in said member, an eccentric liner in said aperture, a shaft extending through said liner, a pinion on said shaft, a gear concentric with said wheel and adapted to mesh with said pinion, and means for adjusting the position of said pinion through said eccentric liner.

5. In combination, a relatively non-rotatable dead axle, an axle housing rotatably supported by said dead axle therebelow and rotatably mounted for bodily movement thereabout, and perches secured to said housing extending upwardly about said dead axle both forwardly and rearwardly thereof for supporting load carrying springs wholly above said dead axle and for limiting said rotary movement of said housing about said dead axle.

6. In combination, a dead axle, a supporting member fixed to each end thereof, a wheel rotatably supported on each end of said axle, an opening in each member eccentric to and below said axle, a housing extending between said openings rotatably received therein, driving shafts rotatably received within said housing each provided with a pinion on the outer end thereof, an internal gear on each of said wheels meshing with the corresponding of said pinions, and a perch for load carrying springs secured to said housing and extending above said dead axle, said perches being provided with portions extending both forwardly and rearwardly of said dead axle providing stops for limiting movement of said housing about said dead axle as a center by contact therewith.

7. In combination, a dead axle, a supporting member fixed to each end thereof, an opening in each of said members eccentric to said dead axle, an eccentric liner received within each of said openings, a peripheral flange on each of said liners, a housing extending between said members rotatably received within said liners, and means for locking said liners against rotation and said housing against axial movement.

8. In combination, a dead axle, a member fixed to each end thereof, an opening in each of said members axially parallel to said dead axle and eccentric thereto, an eccentric liner provided with a peripheral flange rotatably received within each of said openings, a housing extending between said members rotatably received within said liners, a collar fixed to each end of said housing, in abutting relationship with said peripheral flanges, a collar rotatably positioned on each end of said housing inwardly of said collars, and means cooperating with said rotatable collars for limiting axial movement of said housing in respect to said members and for locking said liners against inadvertent rotation.

9. In combination, an axle member, a wheel secured thereto, a housing normally positioned below said axle member and swingable relative thereto, means in said housing for rotating said wheels, and means rigidly secured to said housing and bridging said axle member whereby to support a load carrying spring from a point above said axle without preventing swingable movement of said housing with respect to said axle.

FRANK M. KINCAID.